(12) United States Patent
Naughton

(10) Patent No.: US 11,046,017 B2
(45) Date of Patent: Jun. 29, 2021

(54) DEVICE AND METHOD FOR FORMING COMPLEX JOINTS IN LAYERED SHEET MATERIAL

(71) Applicants: Robert Bosch Battery Systems LLC, Orion, MI (US); Robert Bosch GmbH, Stuttgart (DE)

(72) Inventor: David Naughton, Oxford, MI (US)

(73) Assignees: Robert Bosch Battery Systems LLC, Orion, MI (US); Robert Bosch GmbH, Stuttgart (DE)

( * ) Notice: Subject to any disclaimer, the term of this patent is extended or adjusted under 35 U.S.C. 154(b) by 482 days.

(21) Appl. No.: 15/799,041

(22) Filed: Oct. 31, 2017

(65) Prior Publication Data

US 2018/0126658 A1 May 10, 2018

Related U.S. Application Data

(60) Provisional application No. 62/418,443, filed on Nov. 7, 2016.

(51) Int. Cl.
*B29C 65/24* (2006.01)
*H01M 10/04* (2006.01)
(Continued)

(52) U.S. Cl.
CPC .............. *B29C 65/24* (2013.01); *B29C 65/18* (2013.01); *B29C 66/112* (2013.01); *B29C 66/1122* (2013.01); *B29C 66/131* (2013.01); *B29C 66/1312* (2013.01); *B29C 66/301* (2013.01); *B29C 66/4322* (2013.01); *B29C 66/43441* (2013.01); *B29C 66/71* (2013.01); (Continued)

(58) Field of Classification Search
CPC ....... B29C 65/24; B29C 65/18; B29C 66/112; B29C 66/1122; B29C 66/131; B29C 66/1312; B29C 66/301; B29C 66/4322; B29C 66/43441; B29C 66/71; B29C 66/72321; B29C 66/742; B29C 66/81265; B29C 66/81463; B29C 66/83221; B29C 66/8511; B29C 66/73711; H01M 10/04; H01M 2/0275; H01M 2/0277; H01M 2/0285; H01M 2/0287; H01M 2/029; H01M 2/08; B29K 2705/02; B29L 2031/3468

See application file for complete search history.

(56) References Cited

U.S. PATENT DOCUMENTS 6,841,298 B2   1/2005   Yamashita et al.
7,595,132 B2   9/2009   Kang et al.
(Continued)

*Primary Examiner* — Jacob T Minskey
*Assistant Examiner* — S. Behrooz Ghorishi
(74) *Attorney, Agent, or Firm* — Kelly McGlashen; Maginot, Moore & Beck LLP

(57) ABSTRACT

The sealing device includes a heatable base plate that cooperates with a heatable split plate to simultaneously form three intersecting seal lines. The split plate includes an alpha plate and a beta plate. The alpha plate and the beta plate each include a first heated surface that cooperate with the base heated surface to form a pair of co-linear seal lines. In addition, the alpha plate and the beta plate each include a second heated surface that cooperate together to form a third seal line that extends in a direction perpendicular to the co-linear seal lines and intersects the co-linear seal lines. A method of forming a complex seal joint is also described.

10 Claims, 7 Drawing Sheets

(51) Int. Cl.
  *B29C 65/00*  (2006.01)
  *B29C 65/18*  (2006.01)
  *H01M 50/116*  (2021.01)
  *H01M 50/183*  (2021.01)
  *B29L 31/34*  (2006.01)
  *B29K 705/02*  (2006.01)
  *H01M 50/124*  (2021.01)

(52) U.S. Cl.
  CPC ...... *B29C 66/72321* (2013.01); *B29C 66/742* (2013.01); *B29C 66/81265* (2013.01); *B29C 66/81463* (2013.01); *B29C 66/83221* (2013.01); *B29C 66/8511* (2013.01); *H01M 10/04* (2013.01); *H01M 50/116* (2021.01); *H01M 50/183* (2021.01); *B29C 66/73711* (2013.01); *B29K 2705/02* (2013.01); *B29L 2031/3468* (2013.01); *H01M 50/124* (2021.01)

(56) References Cited

U.S. PATENT DOCUMENTS

| | | | |
|---|---|---|---|
| 9,159,962 B2 | 10/2015 | Takabayashi et al. | |
| 2003/0070396 A1* | 4/2003 | Lam | B65D 71/10 |
| | | | 53/429 |
| 2004/0255664 A1* | 12/2004 | Hishinuma | G01N 19/04 |
| | | | 73/159 |
| 2017/0305044 A1* | 10/2017 | Terasaka | B29C 43/12 |

* cited by examiner

DEVICE AND METHOD FOR FORMING COMPLEX JOINTS IN LAYERED SHEET MATERIAL

CROSS-REFERENCE TO RELATED APPLICATIONS

This application claims priority under 35 U.S.C. § 119(e) to U.S. provisional patent application No. 62/418,443, entitled "DEVICE AND METHOD FOR FORMING COMPLEX JOINTS IN LAYERED SHEET MATERIAL", filed 7 Nov. 2016. The entire contents of the priority application are incorporated by reference herein.

BACKGROUND

Different Lithium-ion battery cell types have emerged in order to deal with the space requirements of a very wide variety of installation situations, and the most common types used in automobiles are cylindrical cells, prismatic cells, and pouch cells. These cell types exhibit substantially the same internal construction, with an anode, a cathode, a separator membrane that separates the cathode space from the anode space, an electrolyte/solvent, and lithium source, but they can differ appreciably in terms of their general dimensions, cell housing, and volumetric energy efficiency.

With respect to the cell housing, for example, the cylindrical cells and prismatic cells each typically have a rigid housing, usually made of metal or plastic, whereas the pouch cell is surrounded only by a flexible outer envelope made of a metal laminated film material which seals off the actual battery space from the environment. This difference in the construction of the cell housing has a large influence on the power-to-weight ratio of the battery cells and can be very important in the manufacture of battery modules and battery packs that are made up of multiple interconnected cells.

A pouch cell housing is formed of a flexible outer envelope made of the metal laminated film, and is used to house an electrode assembly and electrolyte to form a pouch cell. Although some pouch cells are formed using a drawing process which produces cells having limited depth due to drawing limits of the metal laminated film, other pouch cells may be formed via a series of folding and welding steps, whereby the pouch cell can be manufactured in any desired depth. For example, a rectangular blank of the metal laminated film may be folded and welded to form a sealed, generally box-shaped structure. However, it can be difficult to form a reliable sealed joint along weld lines where layered portions of the film have conventionally been folded back on themselves, for example in corners or at joints where multiple weld lines intersect.

SUMMARY

In some aspects, a sealing device is provided for sealing a first material layer to a second material layer along a seal line. The sealing device includes a base plate, an alpha plate and a beta plate. The base plate has a base heatable surface. The alpha plate includes a first alpha plate heatable surface and a second alpha plate heatable surface. The first alpha plate heatable surface faces and is parallel to a first portion of the base heatable surface. The beta plate includes a first beta plate heatable surface and a second beta plate heatable surface. The first beta plate beatable surface faces and is parallel to a second portion of the base heatable surface. In addition, the second beta plate heatable surface faces and is parallel to the second alpha plate heatable surface. The base plate, the alpha plate and the beta plate are relatively movable between a first position and a second position. When in the first position, the base heatable surface, the first alpha plate heatable surface and the first beta plate heatable surface are spaced apart from each other a first distance. When in the second position, the base heatable surface, the first alpha plate heatable surface and the first beta plate heatable surface are spaced apart from each other a second distance that is less than the first distance, and the first alpha plate heatable surface and the first portion of the base heatable surface are urged toward each other, the first beta plate heatable surface and the second portion of the base heatable surface are urged toward each other, and the second alpha plate heatable surface and the second beta plate heatable surface are urged toward each other.

The sealing device may include one or more of the following features. The base heatable surface is an elongate rectangle. The base heatable surface having a base length and a base width, and a ratio of the base length to base width is in a range of 5:1 to 60:1. The base heatable surface has a base length, the first alpha plate heatable surface has a first alpha plate length and the first beta plate heatable surface has a first beta plate length, wherein the sum of the first alpha plate length and the first beta plate length is less than the base length. The second alpha plate heatable surface is oriented at a first angle to the first alpha plate heatable surface, and the second beta plate heatable surface oriented at a second angle to the first beta plate heatable surface. The first angle and the second angle are 90 degrees. The alpha plate is configured to apply pressure to the base plate along a direction that is normal to the base plate, and the beta plate is configured to apply pressure to the base plate along a direction that is acutely angled relative to the base plate. The alpha plate is configured to apply pressure to the base plate along a direction that is at a first acute angle relative to the base plate, and the beta plate is configured to apply pressure to the base plate along a direction that is at a second acute angle relative to the base plate. The first acute angle and the second acute angle have the same absolute value, and an opposed orientation. The first acute angle and the second acute angle mirror each other across a plane parallel to and midway between the second alpha heatable surface and the second beta heatable surface.

In some aspects a method of forming a sealed joint between layers of material is provided. The method includes providing a sealing device. The step of providing a sealing device includes providing a base plate having a base heatable surface, the base heatable surface defining a base long edge that extends between spaced apart base short edges. The step of providing a sealing device includes providing an alpha plate having a first alpha plate heatable surface and a second alpha plate heatable surface, the first alpha plate heatable surface facing a first portion of the base heatable surface. In addition, the step of providing a sealing device includes providing a beta plate having a first beta plate heatable surface and a second beta plate heatable surface, the first beta plate heatable surface facing a second portion of the base heatable surface, the second beta plate heatable surface facing the second alpha plate heatable surface. The method of forming a sealed joint includes providing a first portion of a material sheet, the first portion having a first portion first edge arranged parallel to the base long edge and a first portion fold line that extends transverse to the first portion first edge, the first portion folded about the first portion fold line such that the first portion includes a first parallel portion and a first transverse portion that is angled relative to the first parallel portion. The method of forming a sealed joint includes providing a second portion of a material sheet, the second portion having a second portion first edge arranged parallel to the base long edge and a second portion fold line that extends transverse to the second portion first edge, the second portion folded about the second portion fold line such that the second portion includes a second parallel portion and a second transverse portion that is angled relative to the second parallel portion. The method of forming a sealed joint includes providing a third portion of a material sheet, the third portion having a third portion first edge arranged parallel to the base long edge. The method of forming a sealed joint includes layering the third portion with the base heatable surface such that the third portion first edge is parallel to the base long edge, layering the second parallel portion with the third portion such that the second portion first edge is parallel to the base long edge, and the second portion fold line is parallel to, and disposed between, the base short edges, and layering the first parallel portion with the third portion such that the first portion first edge is parallel to the base long edge, the first portion fold line abuts the second portion fold line, and the first transverse portion faces the second transverse portion. The method of forming a sealed joint includes positioning the alpha plate on top of the first parallel portion such that the first alpha plate heatable surface is parallel to the base long edge and overlies the base heatable surface, and the second alpha plate heatable surface abuts the first transverse portion. The method of forming a sealed joint includes positioning the beta plate on top of the second parallel portion such that the first beta plate heatable surface is parallel to the base long edge and overlies the base heatable surface, and the second beta plate heatable surface abuts the second transverse portion. The method of forming a sealed joint includes forming a first seal line, a second seal line, and a third seal line. The first seal line extends in parallel to, and along, the first portion first edge and joins the first parallel portion to the third sheet portion, the second seal line extends in parallel to, and along, the second portion first edge and joins the second parallel portion to the third sheet portion, and the third seal line joins the first transverse portion to the second transverse portion. The first seal line is formed by applying heat to the base heatable surface and to the first alpha plate heatable surface, and urging the base heatable surface and the first alpha plate heatable surface together. The second seal line is formed by applying heat to the base heatable surface and the first beta plate heatable surface, and urging the base heatable surface and the first beta plate heatable surface together. In addition, the third seal line is formed by applying heat to the second alpha plate heatable surface and to the second beta plate heatable surface, and urging the second alpha plate heatable surface and the second beta plate heatable surface together.

The method may include one or more of the following additional method steps and/or features: The first seal line, the second seal line and the third seal line intersect. The first portion, the second portion, and the third portion are all portions of a single, continuous material sheet. The first portion is a portion of a first material sheet, the second portion is a portion of a second material sheet, and the third portion is a portion of a third material sheet, where each of the first, second and third material sheets is a discrete material sheet that is separate from the others of the first, second and third material sheets. During the step of forming a first seal line, a second seal line, and a third seal line, the alpha plate is configured to apply pressure to the base plate along a direction that is acutely angled relative to the base plate, and the beta plate is configured to apply pressure to the base plate along a direction that is normal to the base plate. During the step of forming a first seal line, a second seal line, and a third seal line, the alpha plate is configured to apply pressure to the base plate along a direction that is at a first acute angle relative to the base plate, and the beta plate is configured to apply pressure to the base plate along a direction that is at a second acute angle relative to the base plate. The first acute angle and the second acute angle have the same absolute value, and an opposed orientation. The first acute angle and the second acute angle mirror each other across a plane parallel to, and midway between, the second alpha heatable surface and the second beta heatable surface. The step of layering the second parallel portion with the third portion may include placing an adhesive layer between the second parallel portion and the third portion; and the step of layering the first parallel portion with the third portion may include placing an adhesive layer between the first parallel portion and the third portion, and placing an adhesive layer between the first transverse portion and the second transverse portion. The first seal line, the second seal line, and the third seal line are formed simultaneously.

A robust sealing device and method are used to provide a battery cell that utilizes a pouch cell housing formed of a metal laminated film. The sealing device and method addresses difficulties in forming reliably sealed complex joints in the pouch material that can be found along weld lines where layered portions of the film have conventionally been folded back on themselves, for example in corners or at joints where multiple weld lines intersect. By providing reliably sealed complex joints, it is possible to also provide pouch cells via folding and welding steps.

Pouch cells formed via a series of folding and welding steps are advantageous compared to some conventionally formed pouch cells since they can be made in any desired size, including pouch cells having a depth that is greater than 20 mm. This can be compared to some pouch conventional pouch cells that are formed by a drawing process. In particular, the maximum draw depth of the metal laminated film used to form the pouch cell is limited by the material properties of the metal layer of the metal laminated film. For example, in some conventional pouch cells formed of an aluminium laminated film, two (2) identical laminated film sheets are drawn to a depth of approximately 6 mm. The active material and separator that form the electrode are sandwiched between the laminated film sheets and the sheets are welded around the circumference with a heating element to form a conventional (drawn) pouch cell. This conventional method limits the thickness of the pouch cell via the drawing process since the aluminum layer does not have the required elongation properties to allow a deeper draw. For example, for some aluminum laminated film materials having a maximum draw depth of about 10 mm, the forming process including the drawing step thus limits the height of the pouch cell that can be formed to about 10 mm to 20 mm, where a cell height h of 20 mm is obtained by sandwiching the active material between two drawn films, where the cell height h corresponds to the draw direction of the material used to form the pouch. This height limit in turn limits the amount of active material that can be stored within the pouch cell. Such conventional pouch cells having drawn cell housings are typically formed with plates having a large area (e.g., length and width dimensions) to achieve acceptable energy outputs. That is, the aspect ratio of cell height to length or width is very small (for example, less than 0.1).

The sealing device includes a heatable base plate that cooperates with a heatable split plate to simultaneously form three intersecting seal lines. The split plate includes an alpha plate and a beta plate. The alpha plate and the beta plate each include a first heated surface that cooperates with the base heated surface to form a pair of co-linear seal lines. In addition, the alpha plate and the beta plate each include a second heated surface that cooperates with each other to form a third seal line that extends in a direction perpendicular to the co-linear seal lines and intersects the co-linear seal lines. This approach provides an individual seal line in each of three intersecting portions, where each of the three seal lines joins the same number of material layers, thus providing a uniform, reliable seal. This can be compared to some conventional sealing devices that include a heatable base plate that cooperates with a heatable unitary plate to form a single seal line, and in which a portion of the material is folded back on itself, whereby the single seal line joins varying numbers of layers along the length of the seal line. In some cases, when forming a seal at locations where material is folded back on itself, the extra material may have an insulating effect, whereby the seal line may have poor integrity in this region.

DETAILED DESCRIPTION

Figure 1:
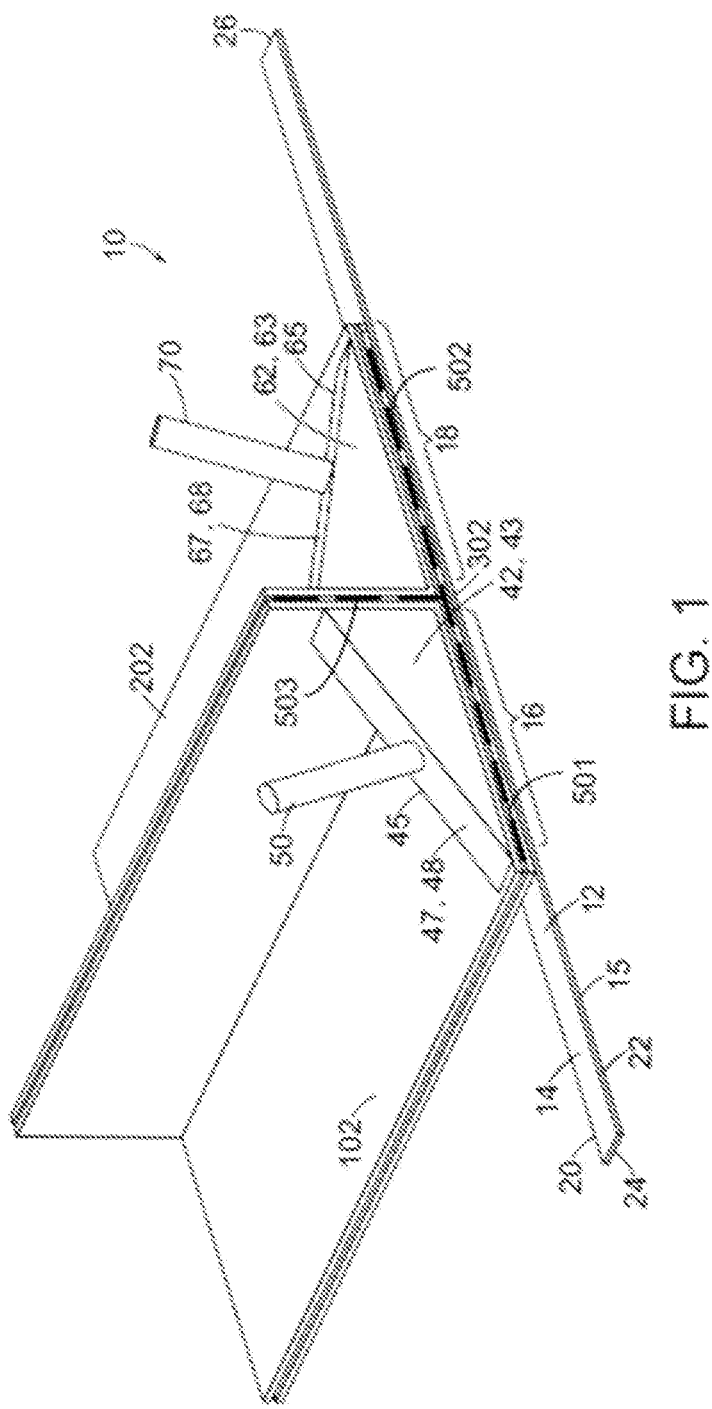
FIG. 1 is a perspective view of a sealing device including a base plate, an alpha plate and a beta plate that cooperate to form a complex seal joint in a layered arrangement of sheet material.
Figure 2:
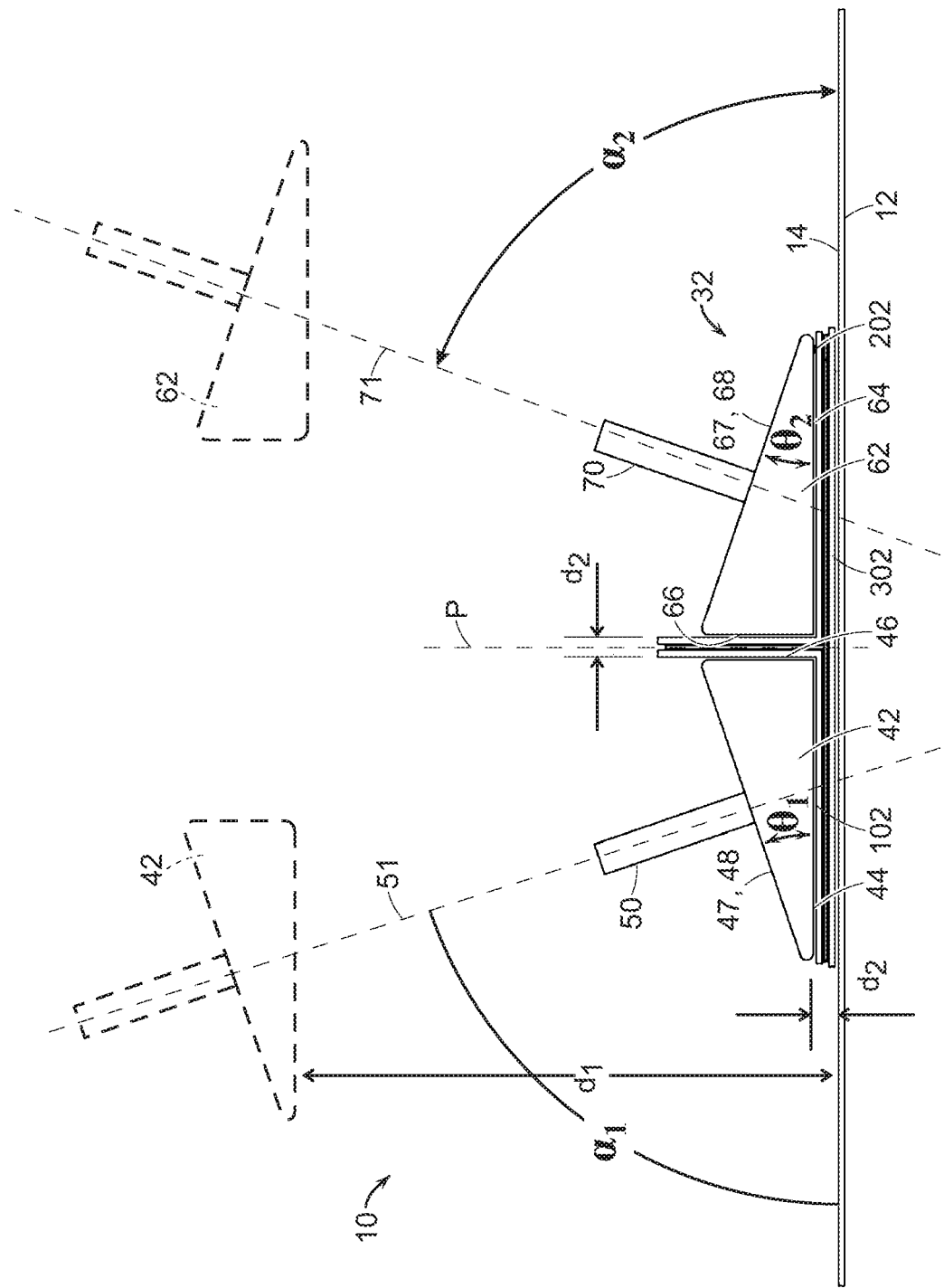
FIG. 2 is a side view of the sealing device of FIG. 1.

Referring to FIGS. 1 and 2, a sealing device 10 is used to join a first material layer to a second material layer along a seal line. To this end, the sealing device 10 includes a base plate 12 that cooperates with a split plate 32 to form seal lines. The base plate 12 includes a heatable surface 14. The split plate 32 includes an alpha plate 42 and a beta plate 62. The alpha and beta plates 42, 62 each include a first heatable surface 44, 64 that cooperates with the base heated surface 14 to form a pair of co-linear, contiguous seal lines. In addition, the alpha and beta plates 42, 62 each include a second heatable surface 46, 66 that cooperate with each other to form a third seal line that extends in a direction perpendicular to the co-linear seal lines and intersects the co-linear seal lines, as discussed further below.

The base plate 12 is an elongate, rectangular plate that includes the base heatable surface 14 that faces the split plate 32, and a second surface 15 that is opposed to the heatable surface 14. The base heatable surface 14 and the second surface 15 are bordered by a four-sided peripheral edge 17. The peripheral edge includes a pair of spaced-apart base plate long sides 20, 22 that define a length of the base plate 12. The base plate long sides 20, 22 are joined at each end by a pair of base plate short sides 24, 26 that define a width of the base plate 12. The heatable surface 14 has the shape of an elongate rectangle, and a ratio R of the base length to base width is in a range of 5:1 to 60:1. In the illustrated embodiment, the ratio R is about 40:1. In the illustrated embodiment, the base plate 12 is fixed to a support structure (not shown) that supplies power to the heatable surface 14.

The alpha plate 42 is a plate having the shape of a right triangle. The alpha plate 42 includes a pair of opposed, planar side surfaces 43, 45 bordered by a three-sided peripheral edge 47. One side of the peripheral edge 47 provides a first alpha plate heatable surface 44, and a second side of the peripheral edge 47 provides a second alpha plate heatable surface 46 that is adjacent to, and oriented perpendicular to, the first alpha plate heatable surface 44. In addition, a third side of the peripheral edge 47 forms a hypotenuse 48 of the triangular alpha plate 42 that is at an angle θ1 relative to the first alpha plate heatable surface 44. In use, the first alpha plate heatable surface 44 faces and is parallel to a first portion 16 of the base beatable surface 14.

A first rod 50 protrudes outward from the alpha plate hypotenuse 48 in a direction normal to the alpha plate hypotenuse 48. A longitudinal axis 51 of the first rod 50 passes through the first alpha plate heatable surface 44 at a location that is generally midway along a length of the first alpha plate heatable surface 44. The first rod 50 allows the alpha plate 42 to be connected to an actuator (not shown) that moves the alpha plate 42 relative to the base plate 12, for example along the longitudinal axis 51. The actuator also applies pressure to the base plate 12 via the alpha plate 42 by urging the alpha plate 42 toward the base plate 12 in a direction along the longitudinal axis 51. The first rod 50 may also include a conduit for a power line that provides power to the heatable surfaces 44, 46 of the alpha plate 42.

The beta plate 62 is, a plate having the shape of a right triangle. The beta plate 62 includes a pair of opposed, planar side surfaces 63, 65 bordered by a three-sided peripheral edge 67. One side of the peripheral edge 67 provides a first beta plate heatable surface 64, and a second side of the peripheral edge 67 provides a second beta plate heatable surface 66 that is adjacent to, and oriented perpendicular to, the first beta plate heatable surface 64. In addition, a third side of the peripheral edge 67 forms a hypotenuse 68 of the triangular beta plate 62 that is at an angle θ2 relative to the first beta plate heatable surface 64. In the illustrated embodiment, the angle θ2 between the beta plate hypotenuse 68 and the first beta plate heatable surface is the same as the angle θ1 between the alpha plate hypotenuse 48 and the first alpha plate heatable surface, but is not limited thereto. In use, the first beta plate heatable surface 64 faces, and is parallel to, a second portion 18 of the base heatable surface 14. In addition, the second beta plate heatable surface 66 faces and is parallel to the second alpha plate heatable surface 46.

A second rod 70 protrudes outward from the beta plate hypotenuse 68 in a direction normal to the beta plate hypotenuse 68. A longitudinal axis 71 of the second rod 70 passes through the first beta plate heatable surface 64 at a location that is generally midway along a length of the first beta plate heatable surface 64. The second rod 70 allows the beta plate 62 to be connected to an actuator (not shown) that moves the beta plate 62 relative to the base plate 12, for example along the longitudinal axis 71. The actuator also applies pressure to the base plate 12 via the beta plate 62 by urging the beta plate 62 toward the base plate 12 in a direction along the longitudinal axis 71. The second rod 70 may also include a conduit for a power line that provides power to the heatable surfaces 64, 66 of the beta plate 62.

Thus, in use, the alpha plate 42 is configured to apply pressure to the base plate 12 along a direction that is at a first acute angle α1 relative to the base plate 12, and the beta plate 62 is configured to apply pressure to the base plate 12 along a direction that is at a second acute angle α2 relative to the base plate 12, where the first acute angle α1 and the second acute angle α2 have the same absolute value, and an opposed orientation. In particular, the first acute angle α1 and the second acute angle α2 mirror each other across a plane P parallel to and midway between the second alpha heatable surface 46 and the second beta heatable surface 66.

The first alpha plate heatable surface 44 has a first alpha plate length and the first beta plate heatable surface 64 has a first beta plate length, wherein the sum of the first alpha plate length and the first beta plate length is less than the base length. A ratio of the base length to the sum of the first alpha plate length and the first beta plate length is at least 1:1. In the illustrated embodiment, the ratio of the base length to the sum of the first alpha plate length and the first beta plate length is at least 2:1. In addition, the width of the first alpha plate heatable surface 44, the first beta plate heatable surface, and the base heatable surface 14 is the same.

The base plate 12, the alpha plate 42 and the beta plate 62 include the heatable surfaces 14, 44, 46, 64, 66 as described above. In some embodiments, the entirety of each of the base plate 12, the alpha plate 42 and the beta plate 62 are heated during use, not just the surfaces 14, 44, 46, 64, 66 identified as heatable. In other embodiments, the base plate 12, the alpha plate 42 and the beta plate 62 are thermally insulating structures that include the heatable surfaces 14, 44, 46, 64, 66 formed thereon. The heatable surfaces 14, 44, 46, 64, 66 may be heated for example via resistance heating or other conventional heating technique.

In use, the base plate 12, the alpha plate 42 and the beta plate 62 are relatively movable between a first position (shown in broken lines in FIG. 2, and a second position (shown in solid lines in FIG. 2). When in the first position, the base heatable surface 14, the first alpha plate heatable surface 44 and the first beta plate heatable surface 64 are spaced apart from each other by at least a first distance d1 that is at least sufficient to allow layers of material to be inserted between the respective heatable surfaces 14, 44, 46, 64, 66. While the base plate 12, the alpha plate 42 and the beta plate 62 are in the first position, the materials to be joined are inserted between respective elements, as described in detail below. After the materials to be joined have been inserted, the base plate 12, the alpha plate 42 and the beta plate 62 are moved to the second position.

In the illustrated embodiment, the base plate 12 is fixed and the alpha and beta plates 42, 62 are moved inward toward the base plate 12 along respective longitudinal axes 51, 71 during the transition from the first position to the second position.

When in the second position, the first portion 16 of the base heatable surface 14 and the first alpha plate heatable surface 44 are spaced apart from each other a second distance d2, the second portion 18 of the base heatable surface 14 and the first beta plate heatable surface 64 are spaced apart from each other the second distance d2, and the second alpha plate heatable surface 46 and the second beta plate heatable surface 66 are spaced apart from each other the second distance d2.

The second distance d2 is less than the first distance d1, and is sufficiently small that the material layers disposed between the respective heatable surfaces 14, 44, 46, 64, 66 are compressed together. Thus, the distance d2 will depend on the thickness of the materials being joined by the sealing device 10.

In the second position, the first alpha plate heatable surface 44 and the first portion 16 of the base heatable surface 14 are urged toward each other, the first beta plate heatable surface 64 and the second portion 18 of the base heatable surface 14 are urged toward each other, and the second alpha plate heatable surface 46 and the second beta plate heatable surface 66 are urged toward each other by the respective actuator(s). In addition, heat is applied to the material layers via the heatable surfaces 14, 44, 46, 64, 66 so that a seal lines are formed in the materials to be joined corresponding to each confronting pair of heatable surfaces. In particular, the region between a first confronting pair including the first portion 16 of the base heatable surface 14 and the first alpha plate heatable surface 44 defines a first seal line 501; the region between another confronting pair including the second portion 18 of the base heatable surface 14 and the first beta plate heatable surface 64 defines a second seal line 502, and the region between yet another confronting pair including the second alpha plate heatable surface 46 and the second beta plate heatable surface 66 defines a third seal line 503.

Figure 3:
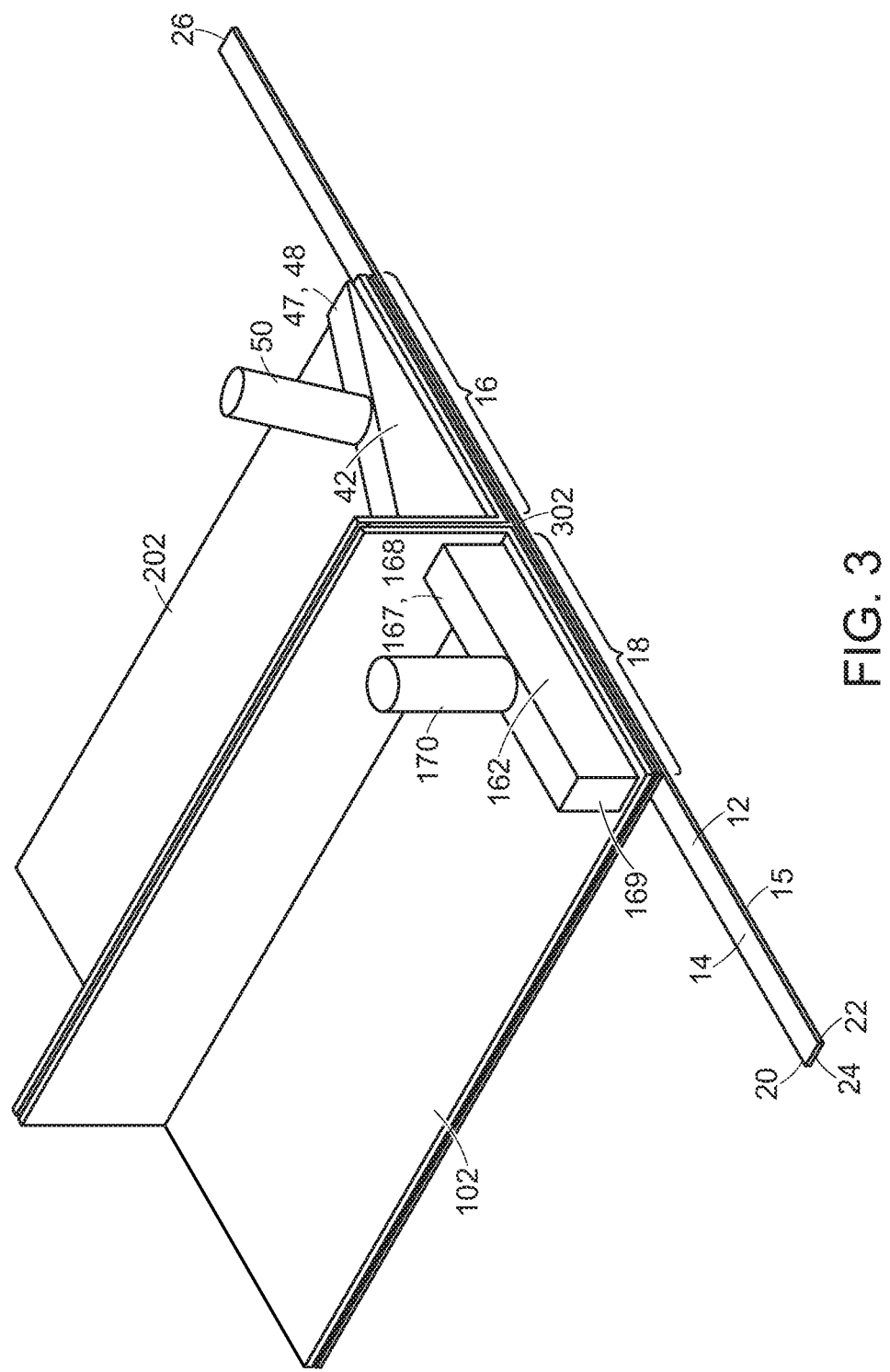
FIG. 3 is a perspective view of an alternative embodiment sealing device including a base plate, an alpha plate and an alternative beta plate that cooperate to form a complex seal joint in a layered arrangement of sheet material.
Figure 4:
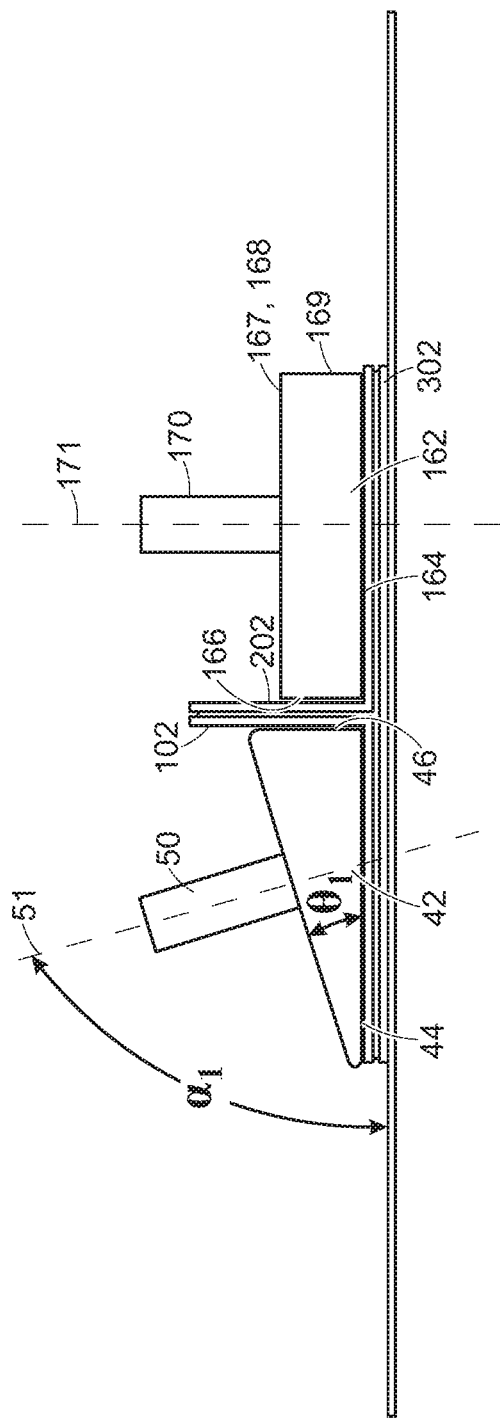
FIG. 4 is a side view of the sealing device of FIG. 3.

Referring to FIGS. 3 and 4, an alternative embodiment sealing device 110 is used to join a first material layer to a second material layer along a seal line. The sealing device 110 is substantially similar in form and function to that of the sealing device 10 described above with respect to FIGS. 1 and 2. For this reason common elements are referred to with common reference numbers, and the description of common elements is not repeated. The sealing device 110 differs from the sealing device 10 described above with respect to FIGS. 1 and 2 in that it includes an alternative embodiment beta plate 162.

The beta plate 162 is a plate having the shape of a right rectangle. The beta plate 162 includes a pair of opposed, planar side surfaces 163, 165 bordered by a four-sided peripheral edge 167. One side of the peripheral edge 167 provides a first beta plate heatable surface 164, and a second side of the peripheral edge 167 provides a second beta plate heatable surface 166 that is adjacent to, and oriented perpendicular to, the first beta plate heatable surface 164. In addition, a third side edge 168 of the peripheral edge 167 is parallel to the first beta plate heatable surface 164, and a fourth side edge 169 of the peripheral edge 167 is parallel to the second beta plate heatable surface 166. In use, the first beta plate heatable surface 164 faces and is parallel to the second portion 18 of the base heatable surface 14. In addition, the second beta plate heatable surface 166 faces and is parallel to the second alpha plate heatable surface 146.

A second rod 170 protrudes outward from the beta plate third side edge 168 in a direction normal to the beta plate third side edge 168, and thus is also normal to the first beta plate heatable surface 164. A longitudinal axis 171 of the second rod 170 passes through the beta plate 162 at a location that is generally midway along a length of the first beta plate heatable surface 164. The second rod 170 allows the beta plate 162 to be connected to an actuator (not shown) that moves the beta plate 162 relative to the base plate 12, for example along the longitudinal axis 171. The actuator also applies pressure to the base plate 12 via the beta plate 162 by urging the beta plate 162 toward the base plate 12 in a direction along the longitudinal axis 171. The second rod 170 may also include a conduit for a power line that provides power to the heatable surfaces 164, 166 of the beta plate 162.

Thus, in use, the alpha plate 42 is configured to apply pressure to the base plate 12 along a direction that is at a first acute angle α1 relative to the base plate 12, and the beta plate 162 is configured to apply a pressure to the base plate 12 along a direction that is normal to the base plate 12.

Figure 5:
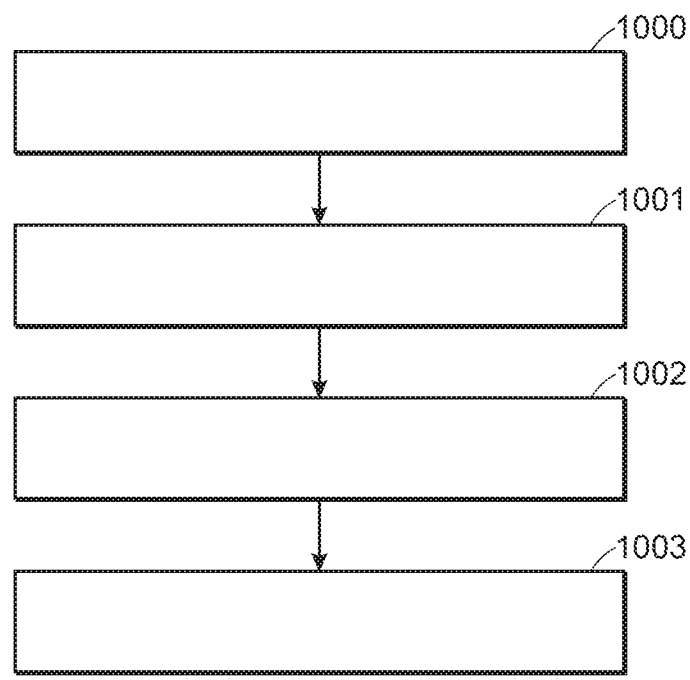
FIG. 5 is a schematic diagram of the method of forming the seal.

Referring to FIG. 5, a method of forming a sealed joint between layers of material using the sealing device 10, 100 will now be described.

In an initial step, the sealing device is provided (Step 1000), and arranged in the first position such that the alpha plate 42 and beta plate 62 are spaced apart from each other and from the base plate 12 a distance sufficient to allow the material to be joined to be inserted between these elements, for example a distance d1.

Figure 6:
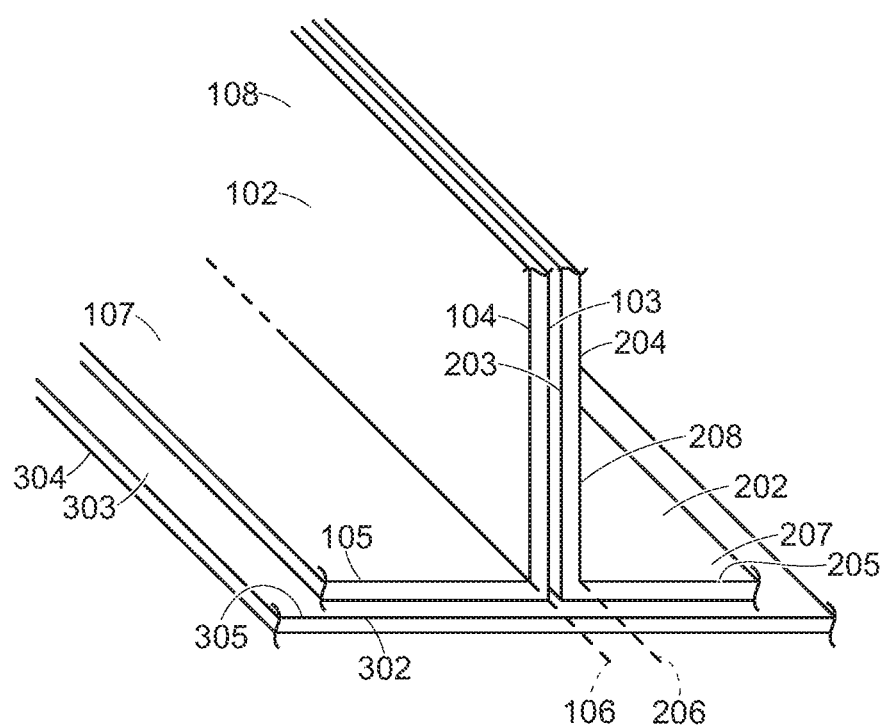
FIG. 6 is a perspective view of portions of material in a layered arrangement.

In addition, the material sheet(s) to be joined is (are) provided (Step 1001), and arranged in the sealing device 10, 110. Referring to FIG. 6, the material sheet(s) to be joined includes a first portion 102, a second portion 202, and a third portion 302.

In some embodiments, the first portion 102, the second portion 202, and the third portion 302 are all portions of a single, continuous material sheet that has been formed into a tube shape, as discussed further below. In other embodiments, the first portion 102 is a portion of a first material sheet, the second portion 202 is a portion of a second material sheet, and the third portion 302 is a portion of a third material sheet, where each of the first, second and third material sheets is a discrete material sheet that is separate from the others of the first, second and third material sheets.

The step of providing the material sheets to be joined includes providing the first portion 102 and arranging the first portion 102 so that a first portion first edge 105 is parallel to the base long edge 22 and an inward-facing surface 103 of the first portion faces the base heatable surface 14. In addition, the first portion includes a first portion fold line 106 that extends transverse to the first portion first edge 105. The first portion 102 is folded about the first portion fold line 106 such that the first portion 102 includes a first parallel portion 107 that is parallel to the base plate 12, and a first transverse portion 108 that is angled relative to the first parallel portion 107.

The step of providing the material sheets to be joined includes providing the second portion 202 and arranging the second portion 202 so that a second portion first edge 2015 is parallel to the base long edge 22 and an inward-facing surface 203 of the first portion faces the base heatable surface 14. In addition, the second portion 202 includes a second portion fold line 206 that extends transverse to the second portion first edge 205. The second portion 202 is folded about the second portion fold line 206 such that the second portion 202 includes a second parallel portion 207 that is parallel to the base plate 12, and a second transverse portion 208 that is angled relative to the second parallel portion 207.

The step of providing the material sheets to be joined includes providing the third portion 302 and arranging the third portion 302 so that a third portion first edge 302 is arranged parallel to the base long edge 22, an inward facing surface 303 of the third portion faces the alpha and beta plates 42, 62, and an outward facing surface 304 of the third portion 302 faces the base heatable surface 14.

The step of providing the material sheets to be joined includes layering the third portion 302 with the base heatable surface 14 such that the third portion first edge 305 is parallel to the base long edge 11. In particular, the third portion 302 extends across both the first and second portions 16, 18 of the base heatable surface 14.

The step of providing the material sheets to be joined includes layering the first parallel portion 107 with the third portion 302 such that the first portion first edge 105 is parallel to the base long edge 22, the first parallel portion 107 overlies the first portion 16 of the base heatable surface 14, and the first portion fold line 106 is parallel to, and disposed between, the base short edges 24, 26.

The step of providing the material sheets to be joined includes layering the second parallel portion 207 with the third portion 302 such that the second portion first edge 205 is parallel to the base long edge 22, the second parallel portion 207 overlies the second portion 18 of the base heatable surface 14, the second portion fold line 206 abuts the first portion fold line 106, and the second transverse portion 208 faces the first transverse portion 108.

After the material sheet(s) to be joined is (are) provided and arranged in the sealing device 10, 110, the sealing device 10, 100 is moved from the first position to the second position (step 1002).

The step of moving the sealing device 10, 100 from the first position to the second position includes positioning the alpha plate 42 in contact with the first parallel portion 107 such that the first alpha plate heatable surface 44 is parallel to the base long edge 22 and overlies the first portion 16 of the base heatable surface 14, and such that the second alpha plate heatable surface 46 abuts the first transverse portion 108.

The step of moving the sealing device 10, 100 from the first position to the second position also includes positioning the beta plate 62 in contact with the second parallel portion 207 such that the first beta plate heatable surface 64 is parallel to the base long edge 22 and overlies the second portion 18 of the base heatable surface 14, and such that the second beta plate heatable surface 46 abuts the second transverse portion 208.

When the sealing device 10, 100 is in the second position, a first seal line 501, a second seal line 502, and a third seal line 503 are formed (Step 1003). The first seal line 501 extends in parallel to, and along, the first portion first edge 105 and joins the first parallel portion 107 to the third sheet portion 302 along a region corresponding to the first portion 16 of the base heatable surface 14. The first seal line 501 is formed by applying heat to the base heatable surface 14 and to the first alpha plate heatable surface 44, and urging the base heatable surface 14 and the first alpha plate heatable surface 44 together.

The second seal line 502 extends in parallel to, and along, the second portion first edge 205 and joins the second parallel portion 207 to the third sheet portion 302 along a region corresponding to the second portion 18 of the base heatable surface 14. The second seal line 502 is formed by applying heat to the base heatable surface 14 and the first beta plate heatable surface 64, and urging the base heatable surface 14 and the first beta plate heatable surface 64 together.

The third seal line 503 joins the first transverse portion 108 to the second transverse portion 208, and intersects the first seal line 501 and the second seal line 502. The third seal line 503 is formed by applying heat to the second alpha plate heatable surface 46 and to the second beta plate heatable surface 66, and urging the second alpha plate heatable surface 46 and the second beta plate heatable surface 66 together.

In this method, the first seal line 501, the second seal line 502, and the third seal line 503 are formed simultaneously. Moreover, since the base heatable surface 14 is a single, elongated heating element, heat is applied to the materials at the location between the first and second portions 16, 18 of the heatable surface 14. This ensures that a secure bond is formed at the intersection of the first, second and third seal lines 501, 502, 503.

The temperatures and pressures used to form the first, second and third seal lines 501, 502, 503 depend at least in part on the type of materials to be joined and the thicknesses of the materials to be joined. Sufficient temperatures and pressures are used to form a sealed bond between adjacent layers of material.

If the seal lines 501, 502, 503 are formed using the sealing device described above with respect to FIGS. 3 and 4, during the forming step, the alpha plate 42 is configured to apply pressure to the base plate along a direction that is acutely angled relative to the base plate 12, and the beta plate 62 is configured to apply pressure to the base plate along a direction that is normal to the base plate.

If the seal lines 501, 502, 503 are formed using the sealing device described above with respect to FIGS. 1 and 2, during the forming step, the alpha plate 42 is configured to apply pressure to the base plate 12 along a direction that is at a first acute angle α1 relative to the base plate 12, and the beta plate 62 is configured to apply pressure to the base plate 12 along a direction that is at a second acute angle α2 relative to the base plate 12. The first acute angle α1 and the second acute angle α2 have the same absolute value, and an opposed orientation. In particular, the first acute angle α1 and the second acute angle α2 mirror each other across the plane P.

Figure 7:
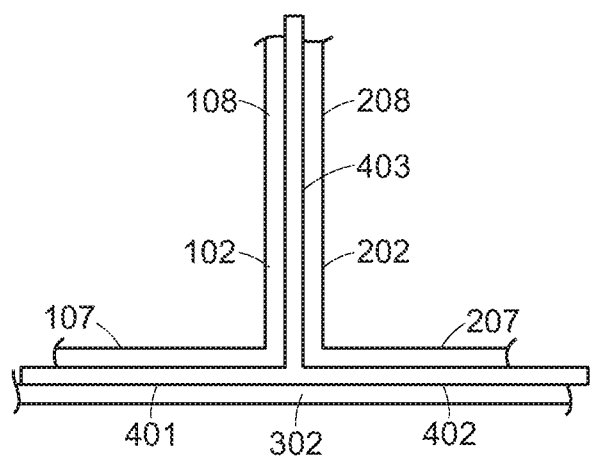
FIG. 7 is an end view of a sealed complex joint illustrating adhesive layers between the layers of material.

Referring to FIG. 7, in some embodiments it can be advantageous to add an adhesive layer between the material layers to enhance the bond between the layers. Thus, in some embodiments, the step of layering the first parallel portion 107 with the third portion 302 includes placing an adhesive layer 401 between the first parallel portion 107 and the third portion 302. Similarly, the step of layering the second parallel portion 207 with the third portion 302 includes placing an adhesive layer 402 between the second parallel portion 207 and the third portion 302. In addition, an adhesive layer 403 is placed between the first transverse portion 108 and the second transverse portion 208.

In one exemplary application, the sealing device 10 can be used to form complex joints when manufacturing a battery cell housing formed of a flexible metal laminated film that is folded and welded to form a pouch type cell housing. The metal laminated film is a multi-layer material that includes a central layer of aluminium foil that is sandwiched between a layer of polyamide and a layer of polypropylene. In one example, some batteries that are used in cellphones employ a pouch cell housing that has the following three layers which are joined by a thin adhesive between adjacent layers: oriented nylon/aluminium foil/polypropylene. In another example, some batteries that are used in electric vehicles employ a pouch cell housing that has the following four layers which are joined by a thin adhesive between adjacent layers: polyethylene terephthalate/oriented nylon/aluminium foil/polypropylene.

Figure 8:
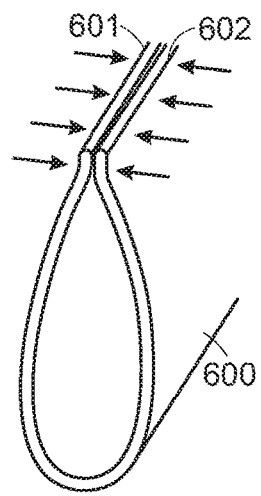
FIG. 8 is a perspective view of a single sheet of material folded back on itself to form a tube.
Figure 9:
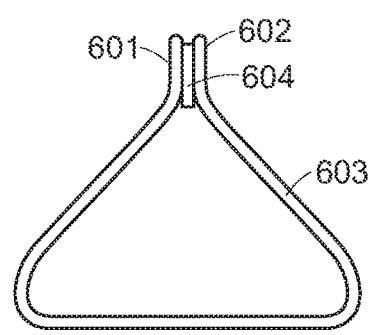
FIG. 9 is an end view of the material tube of FIG. 8 including a sealed joint

Referring to FIGS. 8-11, in some manufacturing methods, the pouch cell may be formed from a single sheet of the metal laminated film. For example, a rectangular blank 600 of the metal laminated film is initially folded back on itself so that the overlapping edges 601, 602 are aligned, and so that the polypropylene layer of one edge 601 contacts the polypropylene layer of the opposed edge 602 (FIG. 8). The overlapping edges are sealed for example via a welding process (indicated by arrows) to form a tube 603 in which the sealed edge 604 protrudes outward (FIG. 9).

Figure 10:
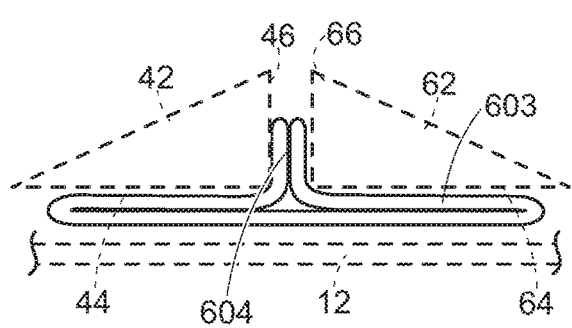
FIG. 10 is an illustration of the material tube of FIG. 8 disposed in the sealing device of FIG. 1 in a first configuration.
Figure 11:
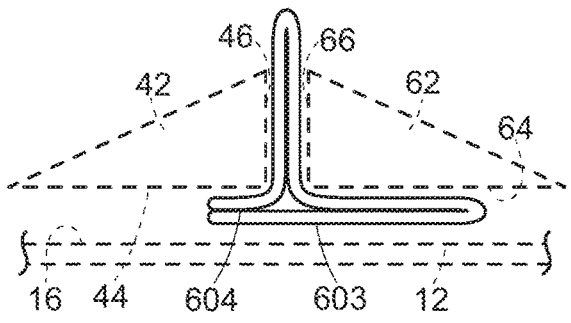
FIG. 11 is an illustration of the material tube of FIG. 8 disposed in the sealing device of FIG. 1 in a second configuration.

The opposed ends of the tube 603 can each be individually sealed in the sealing device 10 to form a sealed pouch. In one sealing configuration, the sealed edge 604 is positioned in the sealing device 10 between the second alpha plate heatable surface 46 and the second beta plate heatable surface 66 during the sealing procedure (FIG. 10). In another configuration, the sealed edge 603 is positioned in the sealing device 10 between the first alpha plate heatable surface 44 and the first portion 16 of the base heatable surface 14 (FIG. 11).

In the illustrated embodiment, the base plate 12 is fixed and the alpha and beta plates 42, 62 are moved inward toward the base plate 12 along respective longitudinal axes 51, 71 during the transition from the first position to the second position. It is understood, however that in other embodiments, each of the base plate 12, the alpha plate 42 and the beta plate 62 may be moved during the transition from the first position to the second position.

Although the material used in the illustrated embodiment to form a pouch cell is a three-layer metal laminated film having a polypropylene layer, an aluminium foil layer, and a polyamide layer, the material used to form the pouch cell may have a greater or fewer number of layers and/or use different materials to form the layers.

In the illustrated embodiment, the method is used to form a pouch cell housing of a battery cell. It is understood, however, that the method may be used to form other products, including, but not limited to, packaging for food.

Selective illustrative embodiments of the apparatus and method are described above in some detail. It should be understood that only structures considered necessary for clarifying the apparatus and method have been described herein. Other conventional structures, and those of ancillary and auxiliary components of the apparatus and method, are assumed to be known and understood by those skilled in the art. Moreover, while working examples of the apparatus and method have been described above, the apparatus and/or method is not limited to the working examples described above, but various design alterations may be carried out without departing from the devices as set forth in the claims.

What is claimed is:

1. A sealing device for sealing first, second and third material sheet portions along first, second and third seal lines, the sealing device comprising
   a base plate having a base heatable surface;
   an alpha plate having a first alpha plate heatable surface and a second alpha plate heatable surface, the first alpha plate heatable surface facing and parallel to a first portion of the base heatable surface, and
   a beta plate having a first beta plate heatable surface and a second beta plate heatable surface, the first beta plate heatable surface facing and parallel to a second portion of the base heatable surface, the second beta plate heatable surface facing and parallel to the second alpha plate heatable surface;
   wherein
   the base plate, the alpha plate and the beta plate are relatively movable between a first position and a second position, when in the first position, the base heatable surface, the first alpha plate heatable surface and the first beta plate heatable surface are spaced apart from each other a first distance, and when in the second position,
- the base heatable surface, the first alpha plate heatable surface and the first beta plate heatable surface are spaced apart from each other a second distance that is less than the first distance,
- the first alpha plate heatable surface and the first portion of the base heatable surface are urged toward each other such that the first seal line is formed between the first material sheet portion and the third material sheet portion,
- the first beta plate heatable surface and the second portion of the base heatable surface are urged toward each other such that the second seal line is formed between the second material sheet portion and the third material sheet portion,
- the second alpha plate heatable surface and the second beta plate heatable surface are urged toward each other such that the third seal line is formed between the first material sheet portion and the second material sheet portion, and
- the base plate, the alpha plate and the beta plate are arranged such that the third seal line intersects with the first seal line and the second seal line.

2. The sealing device of claim 1, wherein the base heatable surface is an elongate rectangle.

3. The sealing device of claim 1, wherein the base heatable surface having a base length and a base width, and a ratio of the base length to base width is in a range of 5:1 to 60:1.

4. The sealing device of claim 1, wherein the base heatable surface has a base length, the first alpha plate heatable surface has a first alpha plate length and the first beta plate heatable surface has a first beta plate length, wherein the sum of the first alpha plate length and the first beta plate length is less than the base length.

5. The sealing device of claim 1, wherein the second alpha plate heatable surface is oriented at a first angle to the first alpha plate heatable surface, and the second beta plate heatable surface oriented at a second angle to the first beta plate heatable surface.

6. The sealing device of claim 5, wherein the first angle and the second angle are 90 degrees.

7. The sealing device of claim 1, wherein the alpha plate is configured to apply pressure to the base plate along a direction that is normal to the base plate, and the beta plate is configured to apply pressure to the base plate along a direction that is acutely angled relative to the base plate.

8. The sealing device of claim 1, wherein the alpha plate is configured to apply pressure to the base plate along a direction that is at a first acute angle relative to the base plate, and the beta plate is configured to apply pressure to the base plate along a direction that is at a second acute angle relative to the base plate.

9. The sealing device of claim 8, wherein the first acute angle and the second acute angle have the same absolute value, and an opposed orientation.

10. The sealing device of claim 8, wherein the first acute angle and the second acute angle mirror each other across a plane parallel to and midway between the second alpha heatable surface and the second beta heatable surface.

* * * * *